(12) United States Patent
Compassi

(10) Patent No.: US 7,114,852 B2
(45) Date of Patent: Oct. 3, 2006

(54) CAGE WITH STORAGE SPACE FOR A LUBRICANT

(75) Inventor: Jean-Jacques Compassi, Cran-Gevrier (FR)

(73) Assignee: SNR Roulements, Annecy (FR)

( * ) Notice: Subject to any disclaimer, the term of this patent is extended or adjusted under 35 U.S.C. 154(b) by 0 days.

(21) Appl. No.: 10/085,110

(22) Filed: Mar. 1, 2002

(65) Prior Publication Data

US 2002/0126927 A1  Sep. 12, 2002

(30) Foreign Application Priority Data

Mar. 1, 2001 (FR) ................................. 01 02822

(51) Int. Cl.
F16C 33/66 (2006.01)
F16C 33/41 (2006.01)
(52) U.S. Cl. ...................................... 384/470; 384/531
(58) Field of Classification Search ................ 384/470, 384/523, 531, 532, 533, 534
See application file for complete search history.

(56) References Cited

U.S. PATENT DOCUMENTS

| 3,597,031 | A |  | 8/1971 | Bill |  |
| 3,743,369 | A | * | 7/1973 | Langstrom | 384/470 |
| 4,781,877 | A |  | 11/1988 | Rabe |  |
| 5,575,569 | A | * | 11/1996 | Shinohara | 384/470 |
| 6,402,386 | B1 | * | 6/2002 | Daikuhara | 384/470 |

FOREIGN PATENT DOCUMENTS

GB    2107003 A  *  4/1983

OTHER PUBLICATIONS

Patent Abstracts of Japan, JP 10-220480, Aug. 21, 1998.
Patent Abstracts of Japan, 10-213138, Aug. 11, 1998.
Patent Abstracts of Japan, 10-213139, Aug. 11, 1998.

* cited by examiner

Primary Examiner—Thomas R. Hannon
(74) Attorney, Agent, or Firm—Oblon, Spivak, McClelland, Maier & Neustadt, P.C.

(57) ABSTRACT

A cage with storage space for a lubricant, particularly for roller bearings operating in a depressurized environment, including at least one storage space containing a lubricant between two chambers of rotating elements. The storage space includes at least one roughly radial or tangential outlet for the lubricant. The storage space advantageously includes an opening that opens towards an axis of the cage.

15 Claims, 4 Drawing Sheets

CAGE WITH STORAGE SPACE FOR A LUBRICANT

BACKGROUND OF THE INVENTION

1. Field of the Invention

The present invention relates to a cage with a lubricant storage space.

2. Discussion of the Background

Sealed roller bearings are generally lubricated with a lubricant that partially fills a free space between rotating elements. The quantity of lubricant available in the free space has a direct influence on the life of the roller bearing, however, overfilling the free space can result in heating of the roller bearing and in leaks.

Certain operating conditions provide an environment where the life of the roller bearing is limited by insufficient lubrication and not by the physical stresses that the rotating elements must tolerate. Under such conditions, the number of rotating elements in the roller bearing may be reduced in order to increase the quantity of lubricant in the roller bearing without increasing the percentage of fill. In certain operating conditions of the roller bearing, for example in a depressurized environment that tends to vaporize the usual lubricants, the quantity of lubricant nevertheless remains a limiting factor for the life of the roller bearing.

One way in which to extend the life of roller bearings is to use special, high-performance, slowly consumed lubricants and ceramic balls with a very low friction coefficient. However, special lubricants are very expensive.

In order to reduce the use of these types of lubricants, document JP 61 140616 proposes the even distribution in the roller bearing of a more traditional lubricant stored beforehand in a roller bearing cage. JP 61 140616 describes a cage that forms a bridge including a chamber that contains the lubricant between two successive elements. The chamber communicates with a space in which the rotating elements move via a single narrow opening oriented from the accommodating space toward the bearing race borne by the outer ring of the roller bearing.

In the invention described in JP 61 140616, when the rotating elements rotate, the lubricant is expulsed progressively, under the effect of centrifugal force, from the chamber toward the bearing race borne by the outer ring. When the rotating elements roll along the bearing race, the rotating elements disperse the lubricant between the two roller bearing rings.

As the reserve lubricant of the invention described in JP 61 140616 does not increase the fill level, it does not lead to heating of the roller bearing. Its even distribution nevertheless makes it possible to increase the use life of the roller bearing. However, this type of cage is complicated to produce. A traditional molding process does not allow the creation of a virtually closed chamber. The cage must therefore be produced using two assembled parts. Likewise, a molding operation cannot allow the production of an orifice in the chamber. Additionally, the distribution of the lubricant generates negative pressure inside the chamber, which negatively impacts the even distribution of the lubricant.

SUMMARY OF THE INVENTION

The present invention advantageously provides a cage with a storage space for lubricant that is simple to produce and that allows more even distribution of the lubricant. This advantage is achieved using a cage with a storage space for lubricant that is remarkable in that the storage space also includes an opening that discharges according to the axis of the cage. The shape makes production of the cage easier.

The opening also constantly keeps the lubricant contained in the recess at the ambient pressure such that no negative pressure is produced within the lubricant contained in the storage space. The lubricant can thus be diffused steadily between the two roller bearing rings.

According to other features of the present invention, the storage space is shaped like a recess including a bottom roughly perpendicular to the axis of the cage, and a lateral wall roughly perpendicular to the bottom. The storage or reserve space is shaped like a recess that opens out from its bottom up to the opening. The outlet is roughly radial and is shaped like a slot that extends from the opening, which allows the production of the recess and the slot in a single molding operation. The storage space includes a number of slots that divide an external face of the storage space into roughly identical surface portions. Additionally, the outlet is tangential and opens into one of the chambers.

The present invention also relates to a method for producing a cage by molding in a clamshell type mold whose parts move with respect to one another according to the same axis, wherein the mold is opened according to the axis of the cage formed in the mold.

Furthermore, the present invention relates to a roller bearing that is remarkable in that it includes a cage according to the present invention.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

The present invention generally relates to a cage with lubricant storage space a lubricant, particularly for roller bearings operating in a depressurized state or environment, of the type including at least one lubricant storage space between two rotating element chambers, where the storage space includes at least one roughly radial or tangential outlet for the lubricant.

Figure 1:
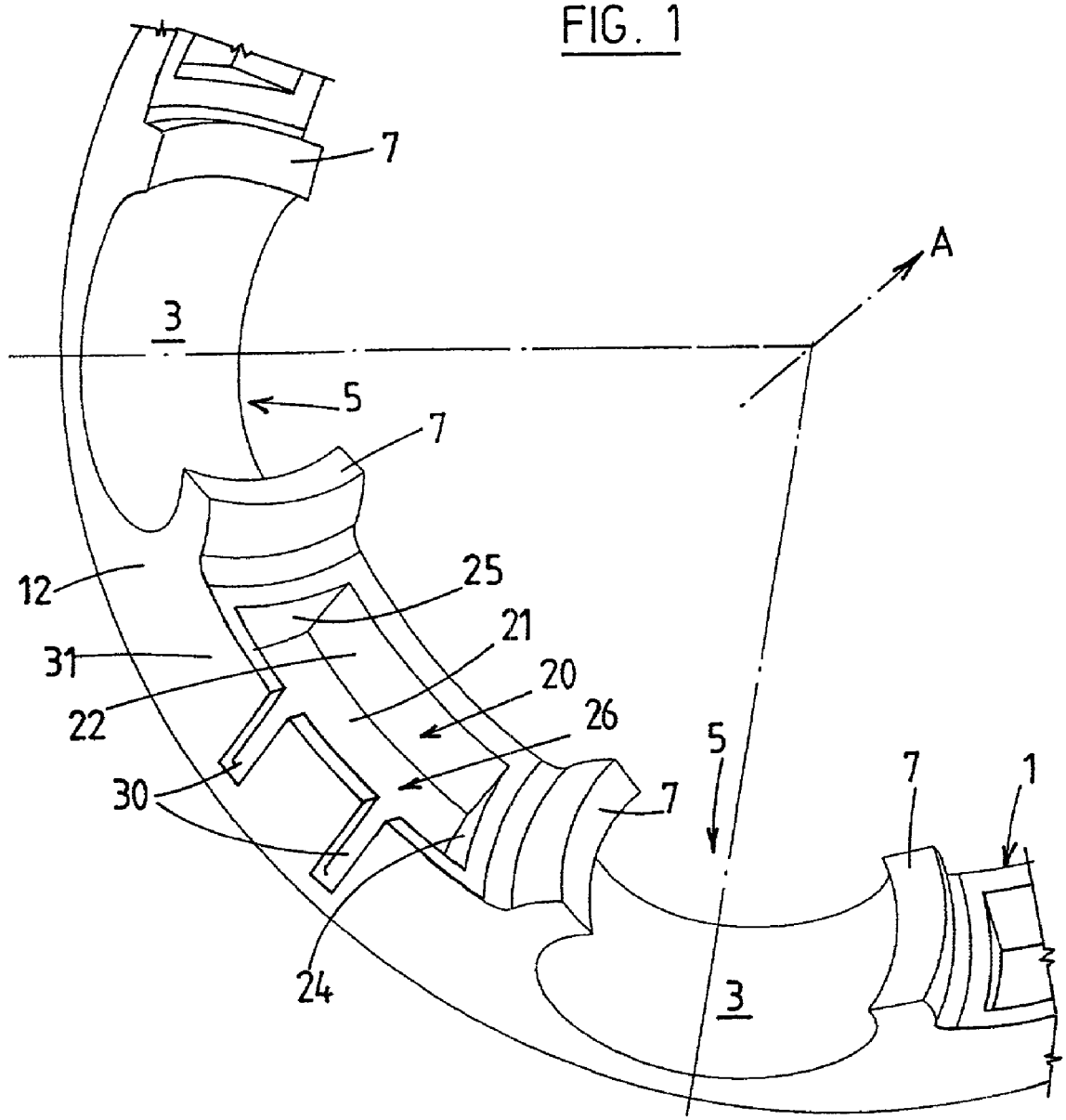
FIG. 1 shows a perspective view of a detail of a cage according to the preferred embodiment of the present invention.
Figure 2:
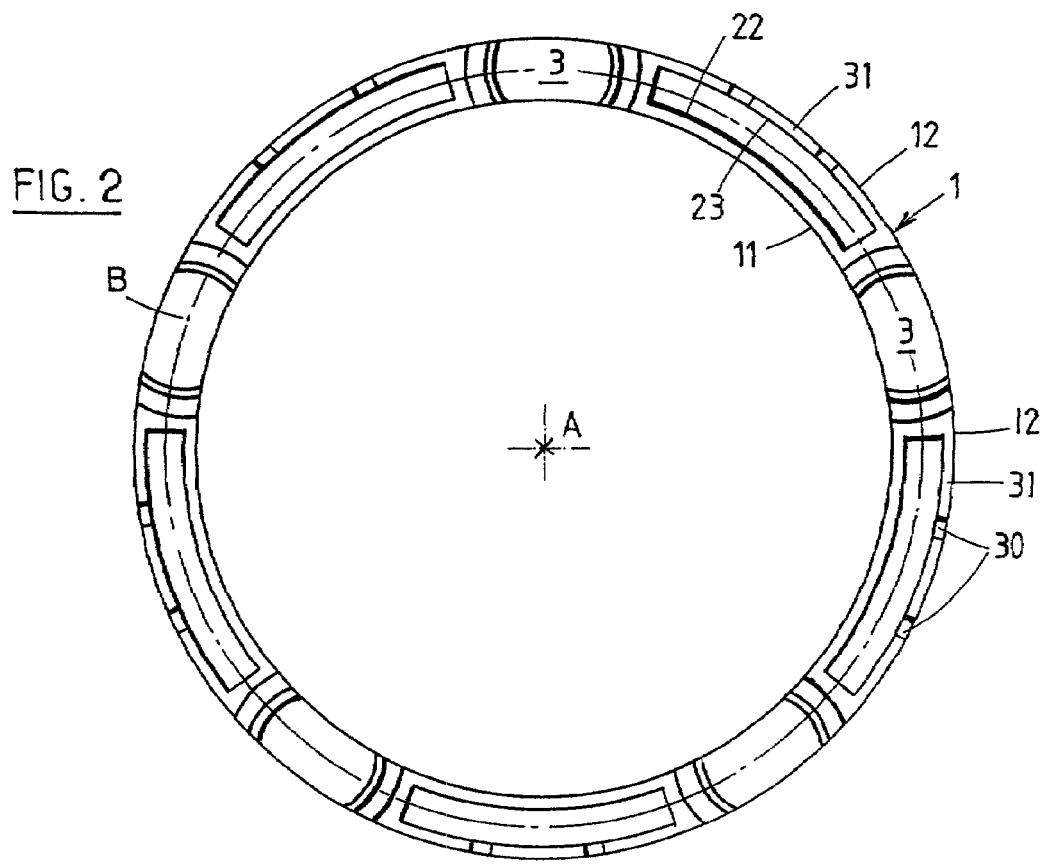
FIG. 2 is a top view of a cage according to the preferred embodiment of the present invention.
Figure 4:
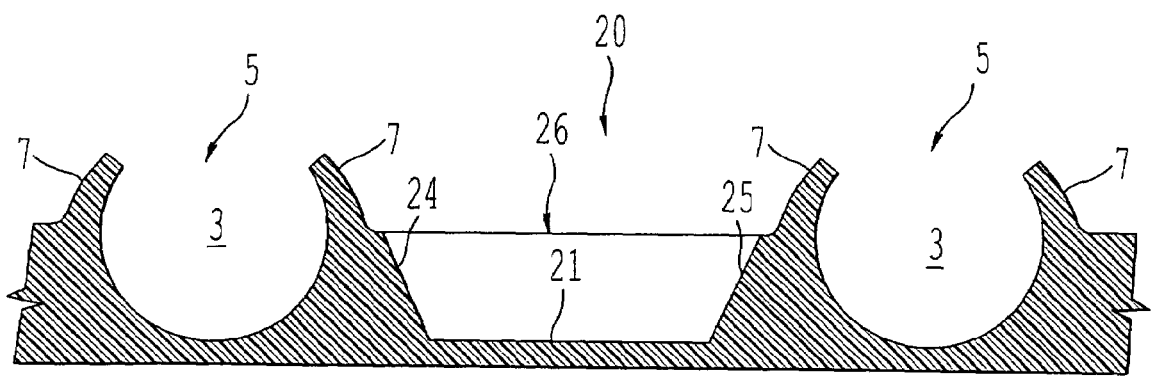
FIG. 4 shows a detail of yet another embodiment of the section folded down according to line B of the cage shown in FIG. 2.

The cage (1), shown in FIGS. 1 and 2, is generally shaped like a ring closed at axis A. The cage (1) can be made of polyamide, for example. Chambers (3) distributed along the length of the cage (1) are formed to receive and maintain balls (not shown) by means of flexible tongues (7). The radial width of the cage (1) is smaller than the diameter of a ball so that in its assembled position, the ball radially extends beyond the inner edge (11) of the cage (1)(i.e., toward axis A of the cage (1)), and the outer edge (12) of the cage (1) (i.e., on the side of the cage (1) opposite axis A).

Between two chambers (3), the cage (1) includes a recess (20), for example, according to the preferred embodiment of the invention. The recess (20) has five faces: one face forming a bottom (21) of the recess (20), where the bottom (21) is roughly flat and roughly perpendicular to axis A of the cage (1); an internal face (22) and an external face (23) roughly parallel to one another, where the internal face (22) is closer to axis A than the external face (23); and two lateral faces (24) and (25) belonging to radial planes and oriented toward each of the two chambers (3). The external face (23) is shown in FIG. 2. The internal face (22) and external face (23) and the lateral faces (24) and (25) delineate the lateral wall of the recess (20). In the preferred embodiment of the invention, the lateral wall of the recess (20) is roughly perpendicular to the bottom (21). An opening (26) of the recess (20) is oriented roughly along axis A of the cage (1), for example on the same side of the cage (1) as the opening (5) of the chambers (3).

The shape and the arrangement of the faces of the recess (20) could be different. For example, the recess (20) could have a roughly cylindrical shape.

In another embodiment, the recess (20) widens out from the bottom (21) to the opening, (26). For example, the faces of the two pairs of faces opposite the recess (20), namely the pair consisting of the lateral faces (24) and (25) and the pair consisting of internal (22) and external (23) faces move away from one another from the bottom (21) to the opening (26). Other examples of flared shapes that can be used are a half sphere or a cone.

The shape of the recess (20) advantageously provides the possibility of unmolding the cage (1) (i.e., removing the cage (1) from the mold) according to or along axis A.

It should be noted, however, that a slight backflow of material partially closing the opening (26) can be acceptable to the extent that the elasticity of the material used enables the cage (1) to be made.

A lubricant is introduced into the recess (20) through the opening (26). The volume of the recesses (20) makes it possible to increase the lubricant storage spaces, but leads to a reduction in the number of balls in the roller bearing. A compromise must therefore be found between the volume of the recesses (20) and the number of balls in the roller bearing. In the preferred embodiment of the invention, the number of balls is reduced, for example to five, in order to increase the quantity of lubricant that can be introduced into the roller bearing.

The external face (23) of the recess (20) comprises at least one slot (30). The slot (30) traverses an external wall (31) of the recess (20) extending between the external face (23) of the recess (20) and the external face (12) of the cage (1). The slot (30) allows lubricant contained in the recess (20) to pass through the external wall (31) of the recess (20) and travel from the recess (20) to a space between the external wall (12) of the cage (1) and an outer ring of the roller bearing (not shown). It is well known that a roller bearing also includes an inner ring (not shown). The slot (30) preferably extends over the entire height of the external face (23) (i.e., from the opening (26) to the bottom (21) of the recess (20)).

By way of example, the figures depict recesses (20) having two slots (30), which divide the external face (23) into three roughly identical surface portions.

Figure 5:
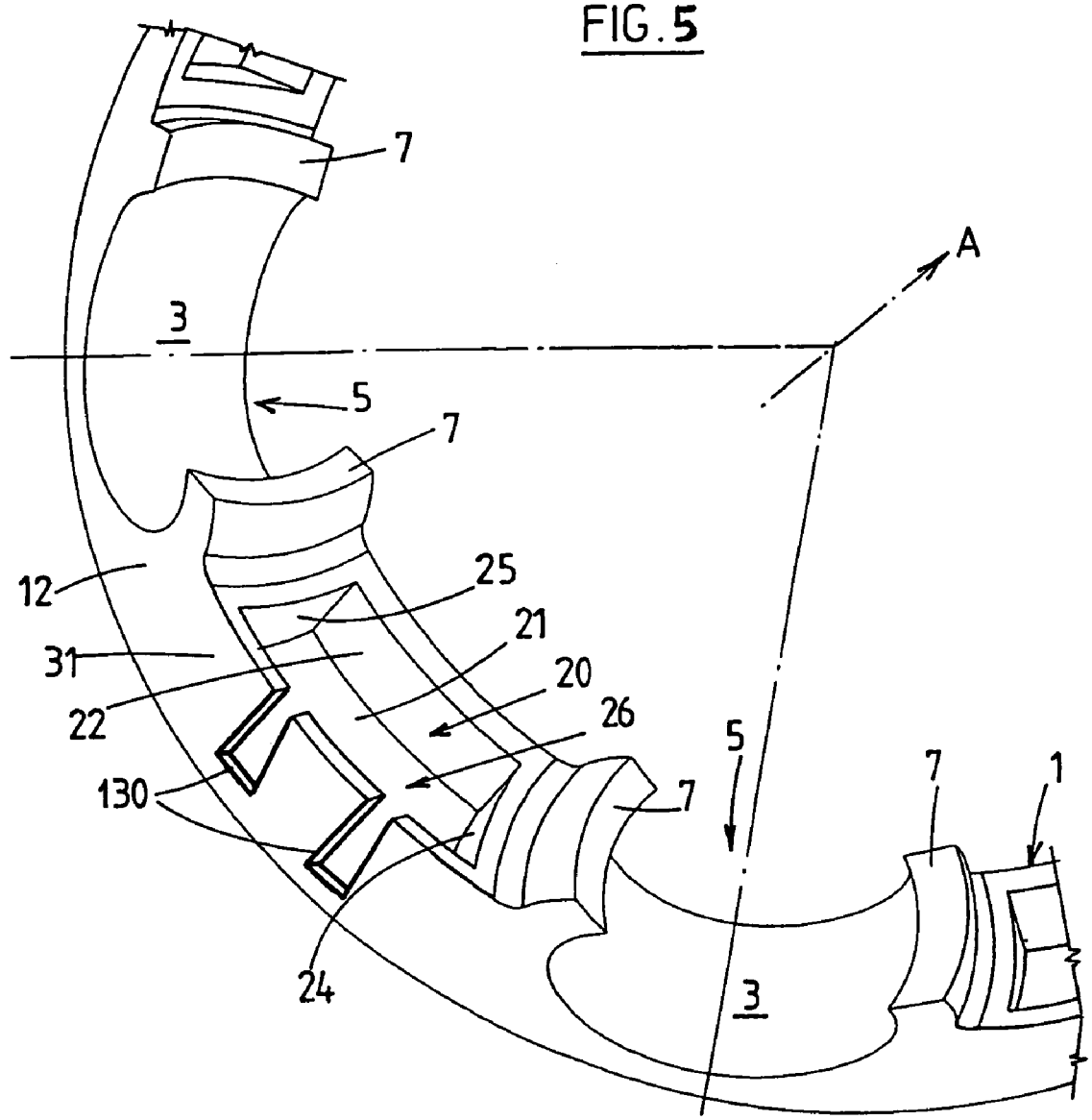
FIG. 5 shows a perspective view of a detail of a cage according to another embodiment of the present invention.

The shape of the slots (30) are roughly rectangular in the preferred embodiment of the invention. However, the shape of the slots (30) can be adapted according to the desired flow rate of the lubricant. For example, FIG. 5 depicts a slot (130) that is widened near the bottom (21) of the recess (20) to allow one to take into account a drop in the level of lubricant in the recess (20) during the life of the roller bearing, and therefore to maintain and even increase the flow rate of lubricant expulsed through the slot (130) at the end of the use life of the roller bearing. However, widening a slot (130) near the bottom (21) of the recess (20) and the presence of tongues (7) partially closing a chamber (3) prohibits the cage (1) from being unmolded according to axis A. The material of the cage (1) is, however, sufficiently elastic so that the cage (1) can be distorted without breaking during unmolding, and then return to its initial shape after unmolding.

Figure 3:
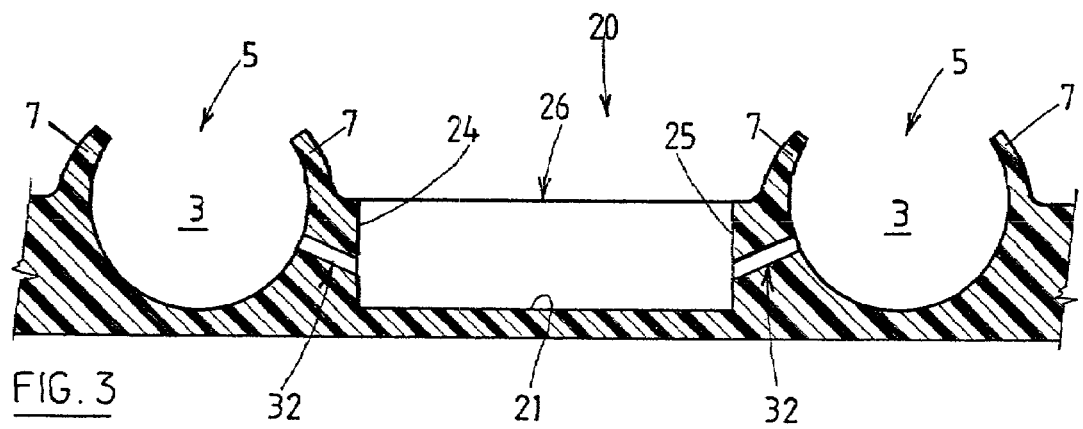
FIG. 3 shows a detail of another embodiment of the section folded down according to line B of the cage shown in FIG. 2.

FIG. 3 shows an alternative embodiment of the cage (1) according to the present invention. According to the alternative embodiment depicted in FIG. 3, the slots (30) are eliminated and replaced by at least one conduit (32) constituting a tangential outlet for the lubricant. The conduit (32) opens on one side onto one of the lateral faces (24) and (25) of the recess (20), and on the other side into a chamber (3). However, the process of manufacturing conduits (32) is a complicated process and cannot be accomplished through a cage (1) molding operation. The conduit (32) can also co-exist with one or more slots (30).

The recesses (20) can be filled at least partially with a lubricant (e.g. grease or a solid lubricant) independent of the assembly of the balls of the roller bearing. The opening (26), which is axial, facilitates filling the recesses (20) with lubricant.

When the inner and outer rings of the roller bearing turn with respect to one another, the balls rotate and drive the cage (1). The lubricant introduced into a recess (20) undergoes a centrifugal force that pushes the lubricant toward the slots (30). The dimensions and the number of slots (30), as well as the viscosity of the lubricant, are selected based on the conditions under which the roller bearing is used (e.g. based on the rotation speed, the environment and the stress on the rings) in order to better regulate the distribution of the lubricant and thus to optimize the life of the roller bearing.

In the embodiment shown in FIG. 3 where the slots (30) are replaced with conduits (32), the accelerations and decelerations of the cage (1) generate the force that expulses the lubricant toward the chambers (3).

The ball present at the mouth of a conduit (32) is an obstacle to the flow of the lubricant. This obstacle is taken into account in determining the diameter of the conduits (32).

The high viscosity of the lubricant allows the lubricant to not leave the recess (20) through the opening (26) solely as a result of gravitational force. However, preferably, the opening (26) is oriented upward, and more preferably still, the opening is oriented vertically.

The lubricant expulsed is distributed over all the bearing surfaces by the rotation of the balls.

The opening (26) of the recess (20) allows air at ambient pressure to occupy the spaces left vacant in the recess (20) by the expulsion of the lubricant. Therefore, there are no empty pockets in the lubricant likely to have an adverse effect on the evenness of the expulsion of the lubricant. The evenness of the expulsion of the lubricant achieved makes it possible to control effectively the volume of lubricant delivered during the life of the roller bearing owing to the particular shapes of the slots (30).

As is now clear, this invention provides a cage (1) with storage space for lubricant that is simple to produce, particularly according to the preferred embodiment. Indeed, the cage (1) can be molded in a single piece, without any subsequent drilling of holes or conduits.

Of course, the invention is not limited to the embodiment described and represented, which is provided solely as an illustrative and non-limiting example.

For example, the orientation of the recesses (20), the number of recesses (20) and the location of the recesses (20) on the cage (1) can be modified. Additionally, the number, shape, and location of the slots (30) and/or the conduits (32) can be modified. Furthermore, rotating elements other than balls could also be used with the cage (1).

This document claims priority and contains subject matter related to French Patent Application No. FR 0102822 (FA 599972), incorporated herein by reference.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the U.S. is:

1. A cage with a storage space for a lubricant having an axis of rotation along an axial axis of said cage, said cage comprising:
   two chambers configured to house two rotating elements, each of the two chambers having an opening on a first side of the cage, a line perpendicular to a surface defining the opening being substantially parallel to the axis of rotation of the cage; and
   at least one substantially closed storage space for lubricant between the two chambers, said storage space comprising an inner wall, two lateral walls, an outer wall, and at least one outlet for the lubricant, wherein the at least one outlet is oriented substantially parallel to the axis of rotation and has an opening on the same side of the cage as the openings of the two chambers, and wherein a first closed conduit is provided from the storage space to one of the two chambers and a second closed conduit is provided from the storage space to the other of the two chambers.

2. The cage as claimed in claim 1, wherein said inner wall is generally locally perpendicular to a radial axis of said cage, and said lateral walls are generally perpendicular to said inner wall.

3. The cage as claimed in claim 1, wherein said storage space is a recess that widens outwardly from a bottom to an opening of said storage space.

4. A roller bearing comprising a cage with a storage space for a lubricant having an axis of rotation along an axial axis of said cage, said cage comprising:
   two chambers configured to house two rotating elements, each of the two chambers having an opening on a first side of the cage, a line perpendicular to a surface defining the opening being substantially parallel to the axis of rotation of the cage; and
   at least one storage space for lubricant between the two chambers, said storage space comprising an inner wall, two lateral walls, an outer wall and at least one outlet for the lubricant, wherein the at least one outlet is oriented substantially parallel to the axis of rotation and has an opening on the same side of the cage as the openings of the two chambers, and wherein a first closed conduit is provided from the at least one storage space to one of the two chambers and a second closed conduit is provided from the a least one storage space to the other of the two chambers.

5. The roller bearing as claimed in claim 4, wherein said inner wall is generally locally perpendicular to a radial axis of said cage, and said lateral walls are generally perpendicular to said inner wall.

6. The roller bearing as claimed in claim 4, wherein said storage space is a recess that widens outwardly from a bottom to an opening of said storage space.

7. The roller bearing as claimed in claim 4, wherein said roller bearing comprises means for operating said roller bearing in a depressurized state.

8. A cage with a storage space for a lubricant having an axis of rotation along an axial axis of said cage, said cage comprising:
   two chambers configured to house two rotating elements, each of the two chambers having an opening on a first side of the cage, a line perpendicular to a surface defining the opening being substantially parallel to the axis of rotation of the cage; and
   at least one substantially closed storage space for lubricant between the two chambers, said storage space comprising an inner wall, two lateral walls, an outer wall, a bottom, an opening, and at least one outlet for the lubricant, wherein the at least one outlet is disposed on the outer wall extending from an edge portion of the outer wall adjacent to the opening toward the bottom, wherein the at least one outlet comprises a slot having a first portion with a first width adjacent to the bottom and a second portion with a second width adjacent to the opening, and wherein the first width is greater than the second width.

9. The cage as claimed in claim 8, wherein said at least one outlet extends generally in a radial direction of said cage.

10. The cage as claimed in claim 8, wherein said inner wall is generally locally perpendicular to a radial axis of said cage, and said lateral walls are generally perpendicular to said inner wall.

11. The cage as claimed in claim 8, wherein said storage space is a recess that widens outwardly from a bottom to an opening of said storage space.

12. The cage as claimed in claim 8, wherein said at least one outlet comprises a plurality of slots that divide the outer wall of said storage space into generally identical surface portions.

13. A cage with a storage space for a lubricant having an axis of rotation along an axial axis of the cage, the cage comprising:
   a storage space for lubricant between a first chamber configured to house a first rotating element and a second chamber configured to house a second rotating element, the storage space comprising a first lateral wall, a second lateral wall, a first closed conduit having an elongated tubular shape, and a second closed conduit having an elongated tubular shape, wherein an end of the first closed conduit opens into the storage space through the first lateral wall and the other end thereof opens into the first chamber, wherein an end of the second closed conduit opens into the storage space through the second lateral wall and the other end thereof opens into the second chamber, and lubricant from the space is supplied to the first and second chambers via each of the closed conduits.

14. The cage according to claim 13, wherein said closed conduits extend in a tangential direction of said cage.

15. A cage with a storage space for a lubricant, comprising:
 at least two chambers configured to house a respective rotating element, said at least two chambers each having an opening; and
 means for storing and supplying a lubricant for the rotating elements,
 wherein said means comprises a storage space provided between two adjacent chambers of the at least two chambers, a first closed conduit extending from the storage space to one of the two adjacent chambers, and a second closed conduit extending from the storage space to the other of the two adjacent chambers, said storage space having an opening on a same side of the cage as the openings of the at least two chambers.

* * * * *